United States Patent
Schmitz et al.

(10) Patent No.: US 6,483,198 B2
(45) Date of Patent: Nov. 19, 2002

(54) HYBRID ELECTRIC VEHICLE HAVING A SELECTIVE ZERO EMISSION MODE, AND METHOD OF SELECTIVELY OPERATING THE ZERO EMISSION MODE

(75) Inventors: Robert W. Schmitz, Littleton; Thomas F. Wilton, Aurora; Joshua J. Anderson, Edgewater, all of CO (US)

(73) Assignee: Transportation Techniques LLC, Denver, CO (US)

( * ) Notice: Subject to any disclaimer, the term of this patent is extended or adjusted under 35 U.S.C. 154(b) by 21 days.

(21) Appl. No.: 09/764,357

(22) Filed: Jan. 19, 2001

(65) Prior Publication Data
US 2002/0096886 A1 Jul. 25, 2002

(51) Int. Cl.⁷ .......................... B60L 11/00; B60L 11/12; B60L 9/00; H02O 3/18
(52) U.S. Cl. .................. 290/40 C; 290/45; 180/65.2; 318/139; 322/16
(58) Field of Search .................. 290/40 C, 45; 180/65.2; 318/139; 322/16

(56) References Cited

U.S. PATENT DOCUMENTS

| | | |
|---|---|---|
| 4,187,436 A | 2/1980 | Etienne |
| 5,285,862 A | 2/1994 | Furutani et al. |
| 5,318,142 A | 6/1994 | Bates et al. |
| 5,345,155 A | 9/1994 | Masaki et al. |
| 5,481,460 A * | 1/1996 | Masaki .................. 346/424.07 |
| 5,512,022 A | 4/1996 | Suzuki |
| 5,589,743 A | 12/1996 | King |
| 5,629,586 A | 5/1997 | Yasuda et al. |
| 5,629,596 A * | 5/1997 | Iijima .......................... 318/762 |
| 5,642,270 A | 6/1997 | Green et al. |
| 5,650,713 A * | 7/1997 | Takeuchi ..................... 322/16 |
| 5,726,541 A | 3/1998 | Glenn et al. |
| 5,739,664 A | 4/1998 | Deng et al. |
| 5,785,138 A * | 7/1998 | Yoshida ..................... 180/65.2 |
| 5,786,640 A * | 7/1998 | Sakai .......................... 290/17 |
| 5,804,935 A | 9/1998 | Radev |
| 5,878,830 A | 3/1999 | Ruppert et al. |
| 5,898,282 A * | 4/1999 | Drozdz ....................... 318/139 |
| 5,905,349 A | 5/1999 | Farkas et al. |
| 5,915,488 A | 6/1999 | Fliege |
| 5,924,504 A | 7/1999 | Ruppert, Jr. et al. |
| 6,073,712 A * | 6/2000 | Buglione ................... 180/65.2 |
| 6,242,873 B1 | 6/2001 | Drozdz et al. |
| 6,314,346 B1 * | 11/2001 | Kitajima ...................... 701/22 |

FOREIGN PATENT DOCUMENTS

| | | |
|---|---|---|
| DE | 197 22 175 A1 | 12/1997 |
| EP | 0 177 770 A1 | 4/1986 |
| EP | 0 496 059 A1 | 7/1992 |
| EP | 0 906 847 A2 | 4/1999 |
| EP | 0 925 988 A2 | 6/1999 |
| WO | WO 94/07301 | 3/1994 |
| WO | WO 98/01941 | 1/1998 |

OTHER PUBLICATIONS

U.S. patent application Ser. No. 09/663,118, filed Sep. 15, 2000.

* cited by examiner

Primary Examiner—Nestor Ramirez
Assistant Examiner—Iraj A Mohandesi
(74) Attorney, Agent, or Firm—Oliff & Berridge, PLC

(57) ABSTRACT

A series type hybrid electric vehicle that controls an internal combustion engine, generator, and electric motor for zero emissions within a zero emission zone. As the vehicle approaches the zero emission zone, the internal combustion engine and generator increase the electrical charge of the battery array to a predetermined level. The internal combustion engine and generator are eventually turned off to prevent emissions from entering the zero emission zone. As the vehicle leaves the zero emission zone, the internal combustion engine and generator are warmed to a predetermined level for a full capacity operation. When the internal combustion engine and generator reach the predetermined level, they operate at full capacity to bring the electrical charge of the battery array to a predetermined electrical level.

56 Claims, 10 Drawing Sheets

HYBRID ELECTRIC VEHICLE HAVING A SELECTIVE ZERO EMISSION MODE, AND METHOD OF SELECTIVELY OPERATING THE ZERO EMISSION MODE

BACKGROUND OF THE INVENTION

1. Field of Invention

The invention relates to methods and apparatus for adaptively controlling a series hybrid electric vehicle to obtain selected zero emission control.

2. Description of Related Art

The desire for cleaner air has caused various federal, state, and local governments to change their regulations to require lower vehicle emissions. Increasing urban traffic congestion has prompted a need for increases in public mass transit services. Many large cities use buses to transport people into, out of, and within traffic congested urban areas. Conventional buses use diesel powered internal combustion engines. Diesel engines produce emissions, including carbon monoxide, that contribute to air pollution. It is possible to refine cleaner diesel fuel. However, cleaner diesel fuel is more costly to refine and causes a corresponding increase in the cost of bus service.

Alternative fuels have been used to reduce emissions and conserve oil resources. Compressed natural gas has been used as an alternative fuel. Compressed natural gas does not produce as much power in conventional internal combustion engines as gasoline and diesel and has not been widely developed or accepted as an alternative to gasoline and diesel.

Additives have also been developed for mixing with gasoline to reduce emissions. Ethanol and MTBE have been added to gasoline to oxygenate the combustion of gasoline and reduce emissions of carbon monoxide. These additives, however, are believed to cause decreased gas mileage and, in the case of MTBE, to be a potential public health threat.

Electric vehicles have been developed that produce zero emissions. Electric vehicles are propelled by an electric motor that is powered by a battery array on board the vehicle. The range of electric vehicles is limited as the size of the battery array which can be installed on the vehicle is limited. Recharging of the batteries can only be done by connecting the battery array to a power source. Electric vehicles are not truly zero emitters when the electricity to charge the battery array is produced by a power plant that burns, for example, coal.

Hybrid electric vehicles have also been developed to reduce emissions. Hybrid electric vehicles include an internal combustion engine and at least one electric motor powered by a battery array. In a parallel type hybrid electric vehicle, both the internal combustion engine and the electric motor are coupled to the drive train via mechanical means. The electric motor may be used to propel the vehicle at low speeds and to assist the internal combustion engine at higher speeds. The electric motor may also be driven, in part, by the internal combustion engine and be operated as a generator to recharge the battery array.

In a series type hybrid electric vehicle, the internal combustion engine is used only to run a generator that charges the battery array. There is no mechanical connection of the internal combustion engine to the vehicle drive train. The electric traction drive motor is powered by the battery array and is mechanically connected to the vehicle drive train.

In present series type hybrid electric vehicles, there is a need to control the engine, generator and electric motor to produce zero emissions. The need to produce zero emissions occurs when the series type hybrid electric vehicle is propelled along a selected route or area where pollution emissions are not tolerated. Such areas include the inside of a building, a tunnel, a densely populated region, or other designated areas.

SUMMARY OF THE INVENTION

The invention provides methods and apparatus for adaptively managing the internal combustion engine, generator, and electric motor to produce zero emissions for a series type hybrid electric vehicle.

An exemplary embodiment of a series type hybrid electric vehicle according to the invention is controlled so that a generator set of the vehicle, including an internal combustion engine connected to a generator, creates zero emissions within a zero emission zone. As the vehicle approaches the zero emission zone, the internal combustion engine and generator increase the electrical charge of the battery array to a predetermined electrical level and are eventually turned off to prevent emissions from entering the zero emission zone. As the vehicle leaves the zero emission zone, the internal combustion engine and generator are warmed to a predetermined thermal level for a full capacity operation. When the internal combustion engine and generator reach the predetermined thermal level, they operate at full capacity to bring the electrical charge of the battery array to a predetermined electrical level. Thereafter, the vehicle operates under a normal operation.

According to an exemplary embodiment, a method for adaptively controlling the state of charge of a battery array of a series type hybrid electric vehicle having an internal combustion engine connected to a generator and at least one electric motor propelling the vehicle through the zone includes determining a zone, turning off the internal combustion engine and the generator before entering the zone, and turning on the internal combustion engine and the generator after leaving the zone.

According to another exemplary embodiment, a series type hybrid electric vehicle includes an internal combustion engine connected to a generator, a battery array receiving current at least from the generator, at least one electric motor receiving current from the battery array, the motor propelling the vehicle, and a controller that determines a zone, turns off the internal combustion engine and the generator before entering the zone, and turns on the internal combustion engine and the generator after leaving the zone.

Other features of the invention will become apparent as the following description proceeds and upon reference to the drawings.

BRIEF DESCRIPTION OF THE DRAWINGS

Various exemplary embodiments of this invention will be described in detail with reference to the following figures, wherein like numerals reference like elements, and wherein.

DETAILED DESCRIPTION OF PREFERRED EMBODIMENTS

Figure 1:
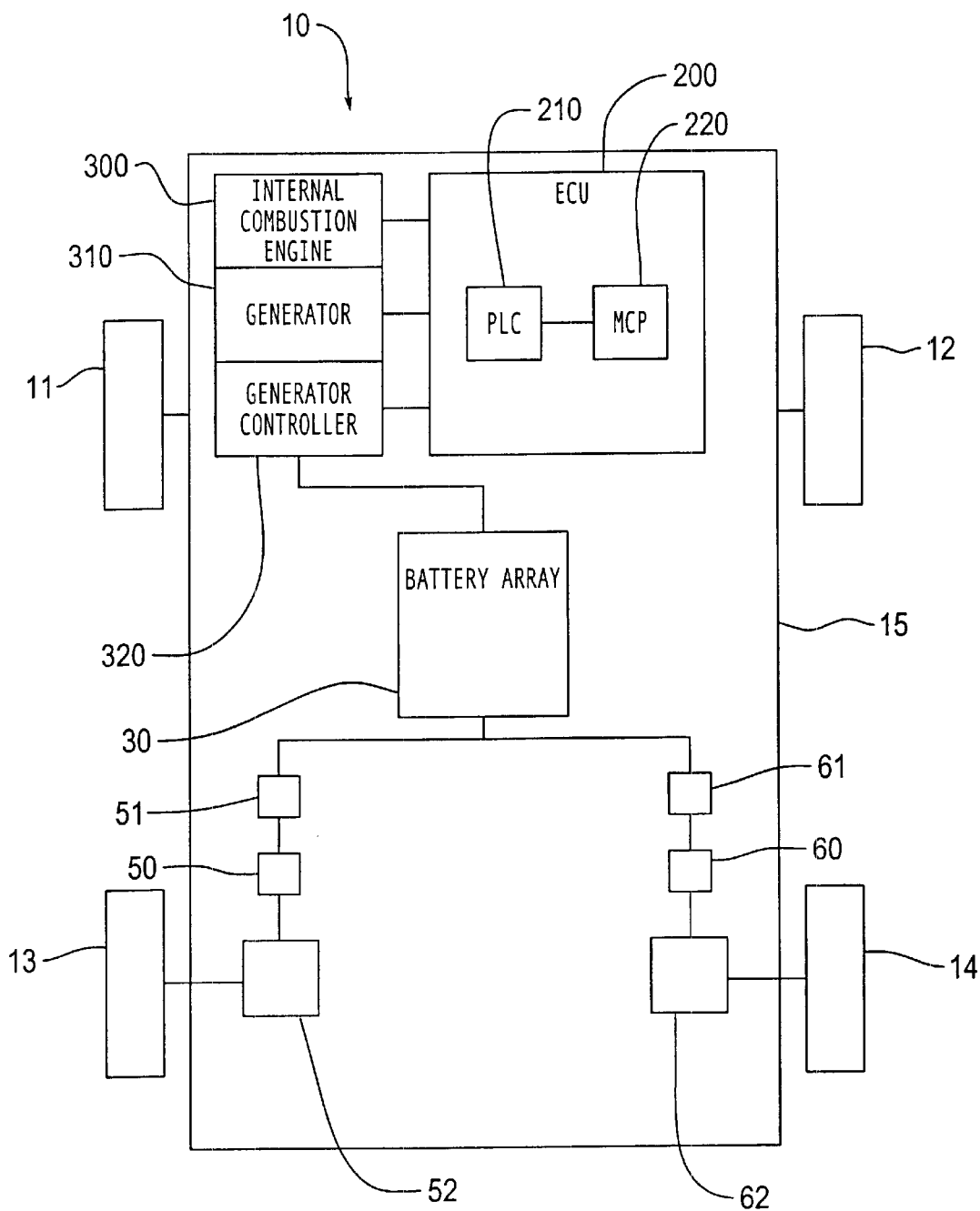
FIG. 1 is schematic view of an exemplary embodiment of a series hybrid electric vehicle according to the invention.

Referring to FIG. 1, an exemplary embodiment of a series type hybrid electric vehicle 10 according to the invention includes a plurality of wheels 11, 12, 13, and 14 and a vehicle chassis 15. The wheels 13 and 14 are coupled to electric motors 50 and 60, respectively, through gear boxes 52 and 62, respectively. The wheels 13 and 14 are independently mounted to respective suspension components, such as swing arms. In this embodiment, the wheels 13 and 14 are not coupled together by an axle. In other embodiments, the wheels 13 and 14 may be coupled together, for example, by an axle. The wheels 13 and 14 may be either the front wheels or the rear wheels of the vehicle 10. In this embodiment, the wheels 11 and 12 are not driven and may be coupled together by an axle. In other embodiments, the wheels 11 and 12 may also be driven.

In an exemplary embodiment of the vehicle according to the invention, the vehicle 10 is a bus having an occupancy capacity in excess of 100. However, it should be appreciated that the vehicle may be a bus of a smaller capacity or that the vehicle may be a smaller passenger vehicle, such as a sedan. In various exemplary embodiments, the vehicle may be any size and form currently used or later developed.

The electric motors 50 and 60 are powered by a battery array 30 and are controlled by motor controllers 51 and 61, respectively. According to an exemplary embodiment of the vehicle 10, the electric motors 50 and 60 are synchronous, permanent magnet DC brushless motors. Each electric motor 50 and 60 is rated for 220 Hp and 0–11,000 rpm. The maximum combined power output of the electric motors 50 and 60 is thus 440 Hp. The permanent magnet DC brushless motors include permanent magnets, such as rare earth magnets, for providing a magnetic field as opposed to AC induction motors which create or induce a magnetic field on the rotating portion of the motor. The DC brushless motors are thus inherently more efficient than AC induction motors as no losses occur from inducing the magnetic field. The DC brushless motors also have a more useful torque profile, a smaller form factor, and lower weight than AC induction motors. The DC brushless motors also require less energy input for an equivalent power output than AC induction motors. However, this invention is not limited to permanent magnet DC brushless motors, and other types of electric motors, such as AC induction motors, can be used.

The series type hybrid electric vehicle 10 also includes a generator set (genset) 300, 310 including an internal combustion engine 300 and a generator 310 that is driven by the internal combustion engine 300. The internal combustion engine 300 may be powered by gasoline, diesel, or compressed natural gas. It should be appreciated, however, that the internal combustion engine 300 may be replaced by a fuel cell, turbine or any other number of alternatives for creating usable electric power. According to an exemplary embodiment of the invention, the internal combustion engine 300 may be a 2.5 liter Ford LRG-425 engine powered by compressed natural gas. The engine 300 is operated to produce 70 Hp. It should be appreciated that the power of the engine 300 may be increased by increasing the RPM of the engine 300 and decreased by decreasing the RPM of the engine 300. In this embodiment with two 220 Hp electric motors 50 and 60 and an internal combustion engine 300 operating at 70 Hp, the performance enhancement factor of the vehicle 10 is 440/70, or at least 6.2. Other internal combustion engines can of course be utilized.

The generator 310 is a DC brushless generator that produces, for example, 240–400 $V_{AC}$. In an exemplary embodiment of the vehicle 10, the generator is operated to produce 345 $V_{AC}$ during certain drive modes. An output shaft of the internal combustion engine 300 is connected to the generator 310 and the AC voltage of the generator 310 is converted to a DC voltage by a generator controller 320. The converted DC voltage charges the battery array 30. The battery array may include, for example, 26 deep cycle, lead-acid batteries of 12 volts each connected in series. It should be appreciated, however, that other batteries, such as nickel cadmium, metal hydride or lithium ion, may be used and that any number of batteries can be employed, as space permits. Depending upon the load on the vehicle 10, the battery array voltage ranges between 240 and 400 $V_{DC}$.

An electronic control unit (ECU) 200 includes a programmable logic controller (PLC) 210 and a master control panel (MCP) 220. The MCP 220 receives input from various sensors and provides the connection to outputs in the vehicle 10 regarding the information received from the sensors. Some or all of the information is provided to the PLC 210. The PLC 210 executes various programs to control, for example, the internal combustion engine 300, the generator 310, the generator controller 320, the electric motors 50 and 60, and the motor controllers 51 and 61, based in part on information received from the MCP 220.

Although not shown in the drawings, the vehicle 10 includes a cooling system or cooling systems for the internal combustion engine 300, the generator controller 320, the battery array 30, and the motor controllers 51 and 61. The cooling system may be a single system which includes a coolant reservoir, a pump for pumping the coolant through a heat exchanger such as a radiator and a fan for moving air across the heat exchanger or a plurality of cooling systems similarly constructed. The ECU 200 controls the cooling systems, including the pumps and the fans, to perform a heat shedding operation in which the heat generated by the engine 300, the controllers 320, 51, and 61, the battery array 30, and various other systems is released to the atmosphere. Any acceptable means and methods for cooling the vehicle components may be utilized.

Figure 2:
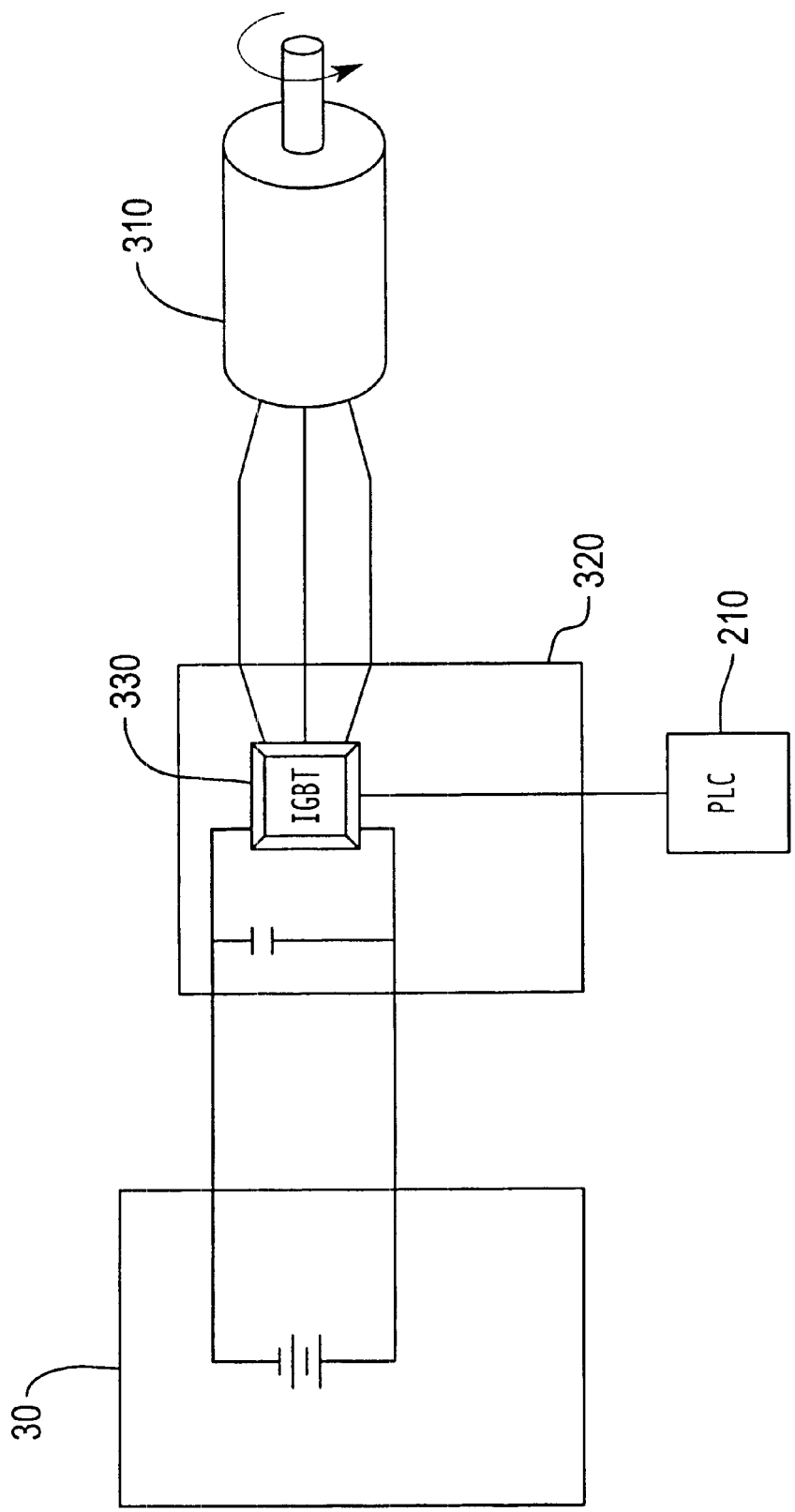
FIG. 2 is a schematic diagram illustrating an exemplary embodiment of a circuit for controlling charging of the battery array by the generator.

As shown in FIG. 2, the coils of the generator 310 are connected to the generator controller 320. The generator controller 320 includes two switching insulated or isolated gate bipolar transistors (IGBT) 330 per phase of the generator 310 and their corresponding diodes. In an exemplary embodiment including a three phase generator 310, the generator controller includes 6 IGBT 330. The PLC 210 controls each IGBT 330 of the generator controller 320 to control the conversion of the AC voltage of the generator 310 to the DC voltage for charging the battery array 30. The PLC 210 may switch the IGBT 330 off when the SOC of the battery array 30 reaches an upper control limit to stop the conversion of the AC voltage to DC voltage and prevent overcharging of the battery array 30.

According to an exemplary embodiment of the invention, the engine 300 runs continuously during operation of the vehicle 10 and continuously turns the shaft of the generator 310. The PLC 210 switches each IGBT 330 on and off via high speed pulse width modulation (PWM) to control charging of the battery array 30. It should be appreciated however that the PLC 210 may control the engine 300 by turning the engine 300 on and off to control charging of the battery array 30.

Figure 3:
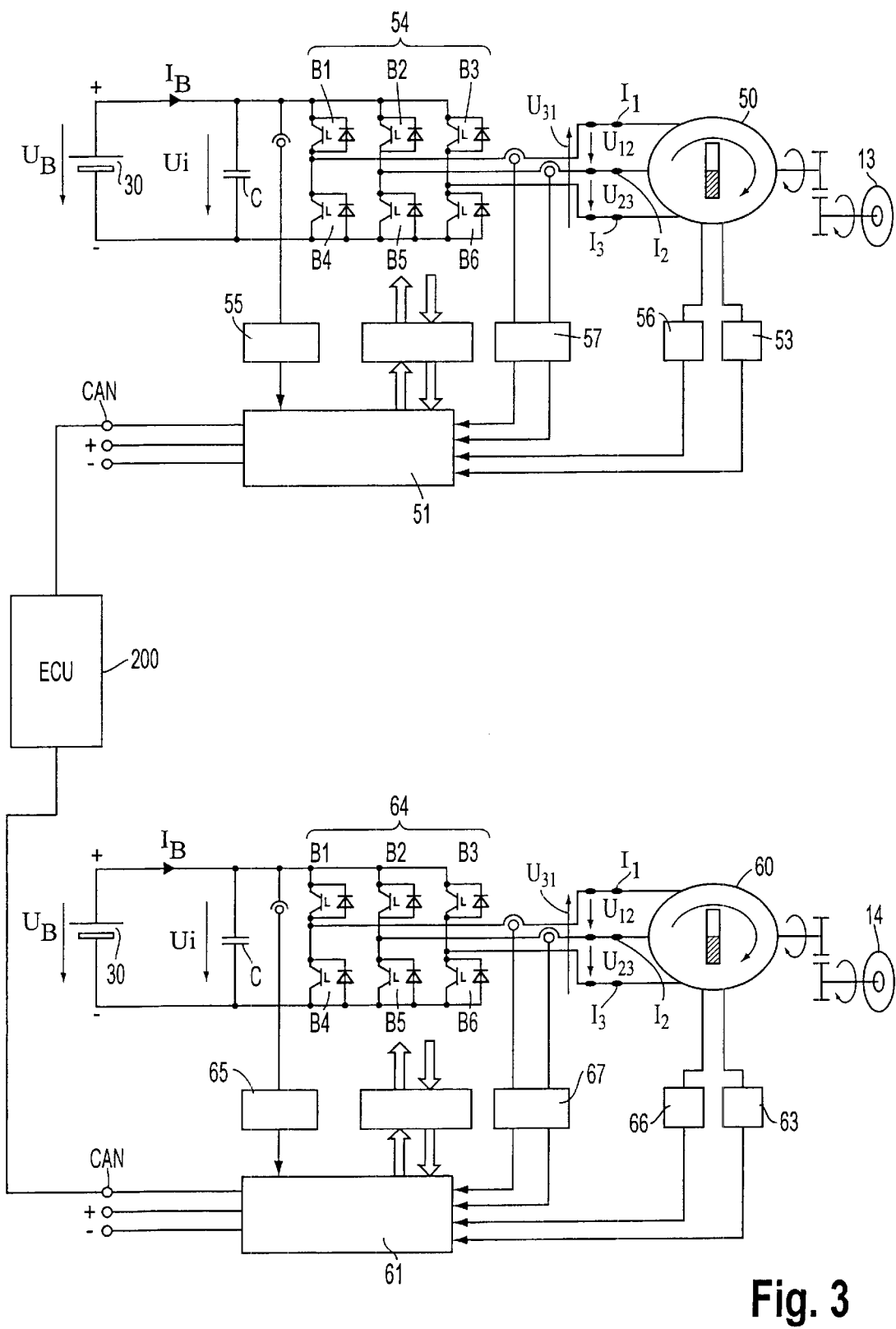
FIG. 3 is a diagram illustrating an exemplary embodiment of a circuit for controlling the electric motors.

Referring to FIG. 3, a control circuit for the electric motors 50 and 60 includes the motor controllers 51 and 61. The motor controllers 51 and 61 receive power from the battery array 30 and distribute the power to the electric motors 50 and 60 by switches B1–B6 of pulse width modulation (PWM) inverters 54 and 64. The PWM inverters 54 and 64 generate AC current from the DC battery array 30. The battery current $I_B$ is distributed by the switches B1–B6, for example IGBT, of the PWM inverters 54 and 64 into motor currents $I_1$, $I_2$, and $I_3$ for driving the motors 50 and 60. The motor controllers 51 and 61 distribute the battery current $I_B$ via the switches B1–B6 by factoring feedback from position sensors 53 and 63 and encoders 56 and 66 that determine the timing or pulsing of electromagnets of the motors 50 and 60. The pole position sensors 53 and 63 determine the pole positions of the permanent magnets of the motors 50 and 60 and the encoders 56 and 66 determine the phase angle. It should be appreciated that each pair of pole position sensors 53 and 63 and encoders 56 and 66, respectively, may be replaced by a phase position sensor and the phase change frequency may be read to determine the speed of rotation of the electric motors 50 and 60.

The motor controllers 51 and 61 calculate the motor connector voltages $U_{12}$, $U_{31}$, and $U_{23}$ based on the rotary velocity and the known flux value of the motors 50 and 60 between the motor connectors. The operating point of the inverters 54 and 64 is then determined by the rectified voltages of the diodes of the switches B1–B6 or by the voltage Ui of an intermediate circuit including a capacitor C. If the voltage Ui becomes larger than the battery voltage $U_B$, uncontrolled current may flow to the battery array 30. Voltage sensors 55 and 65 determine the voltage Ui and the motor controllers 51 and 61 compare the voltage Ui to the battery voltage $U_B$. The motor controllers 51 and 61 activate the switches B1–B6 to cause magnetizing current to flow to the motors 50 and 60 to avoid unnecessary recharging of the battery array 30.

As shown in FIG. 3, each motor controller 51 and 61 receives control data from the ECU 200 through a controller area network (CAN). The ECU 200 can communicate with the various sensors and the motor controllers 51 and 61 by, for example, DeviceNet™, an open, global industry standard communication network.

Figure 4:
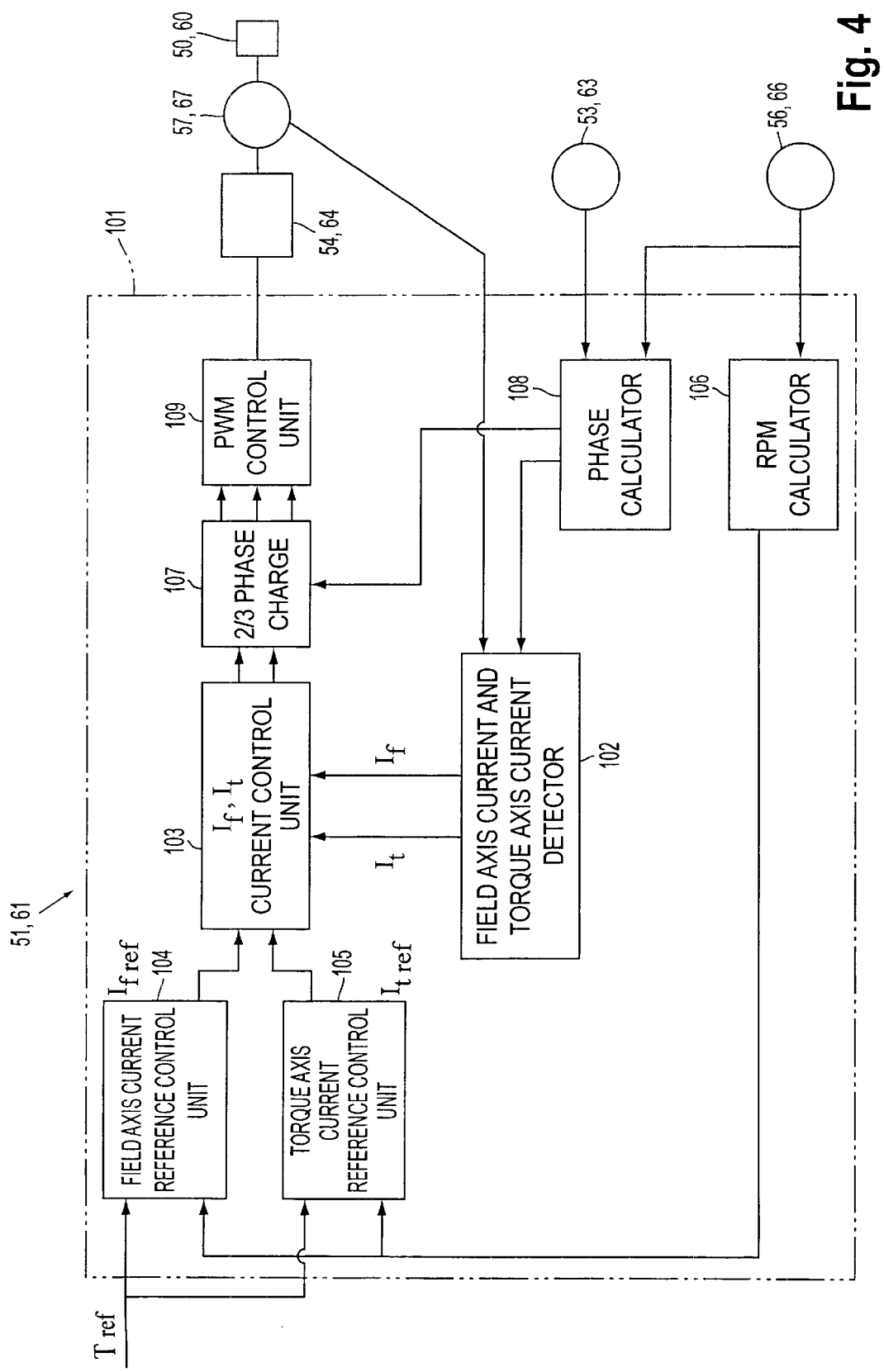
FIG. 4 is a diagram illustrating an exemplary embodiment of a circuit of the motor controllers.

Referring to FIG. 4, each motor controller 51 and 61 includes a control unit 101 which includes a field axis current and tongue axis current detector 102, a field axis current and torque axis current control unit 103, a field axis current reference control unit 104, a torque axis current reference control unit 105, an rpm calculator 106, a 2/3 phase changer 107, a phase calculator 108 and a PWM control unit 109.

The detector 102 calculates the torque axis current $I_t$ and the field axis current $I_f$ by executing a 3-phase, 2-phase coordinate transfer from the input of (1) current detectors 57 and 67 that measure the 3-phase AC current of the motors 50 and 60 and (2) phase calculator 108 that receives input from the position sensors 53 and 63 and the encoders 56 and 66. The field axis current $I_f$ is a measure of the current used for winding the motor and the torque axis current $I_t$ is a measure of the back electric current in maintaining the synchronized rotation of the motors 50 and 60 when the rotation of the motors 50 and 60 is reduced.

The output of detector 102 goes to the field axis current and torque axis current control unit 103. The current control unit 103 receives (1) a field axis current reference value $I_{fref}$ from the field axis current reference control unit 104 and (2) a torque axis current reference value $I_{tref}$ from the torque axis current reference control unit 105.

The reference control units 104 and 105 determine the current reference values $I_{fref}$ and $I_{tref}$ by comparing a torque reference value $T_{ref}$ (which is determined by the position of an accelerator pedal of the vehicle) with the actual rotational velocity determined by the rpm calculator 106 that receives input from the encoders 56 and 66.

The 2/3 phase changer 107 receives input from the current control unit 103 and the phase calculator 108, and calculates the 3-phase AC reference values by performing a 2-phase/3-phase coordinate transformation. The PWM control unit 109 generates a PWM signal by comparing the 3-phase reference values received from the 2/3 phase changer 107 with a triangular wave signal. The PWM control unit 109 communicates this PWM signal to the PWM inverters 54 and 64.

Figure 5:
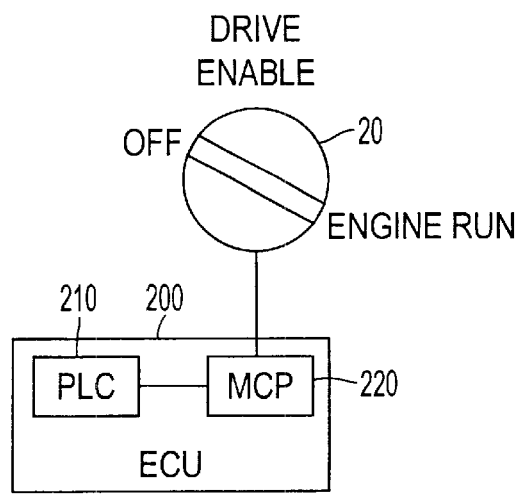
FIG. 5 is a diagram illustrating an exemplary embodiment of a master control switch.

Referring to FIG. 5, a master control switch 20 positioned, for example, in an operator area of the vehicle 10, includes an off position, a drive enable position and an engine run position. Any acceptable switch mechanism can be employed. The rotary switch 20 in FIG. 5 is merely an example of an acceptable switch. The position of the switch 20 is input to the MCP 220. When the switch 20 is moved to the drive enable position, the PLC 210 controls the electric motors 50 and 60 to run the vehicle in a driver selected zero emissions mode by drawing power from the battery array 30. The engine 300 is not operated during the zero emissions mode. The range of the vehicle 10 in zero emissions mode is limited as the state of charge (SOC), i.e., the amount of energy stored within a battery, of the battery array 30 will eventually be lowered below a level sufficient to drive the electric motors 50 and 60 to propel the vehicle.

When the switch 20 is moved to the engine run position, the ECU 200 instructs the generator 310 to operate as a motor for starting the engine 300. During the starting of the engine 300, the generator 310 receives current from the battery array 30. The current is supplied until the engine 300 reaches a predetermined idling speed and then the current supply is stopped. The engine 300 then drives the generator 310 to charge the battery array 30, as necessary. The ECU 200 controls the engine 300 by monitoring the engine speed (rpm) as sensed by a tachometer (not shown) and the fuel mixture as sensed by an oxygen sensor (not shown). The ECU 200 may, for example, control a fuel injection amount of the engine 300 and/or the position of a throttle valve of the engine 300. The ECU 200 may also monitor engine conditions such as the oil pressure and the coolant temperature as detected by sensors (not shown). An automatic zero emission mode is provided by the ECU 200 while in the engine run position when the SOC of the battery array 30 is sufficient or when the sensors of the vehicle 10 sense areas and routes where zero emission modes are required.

Figure 6:
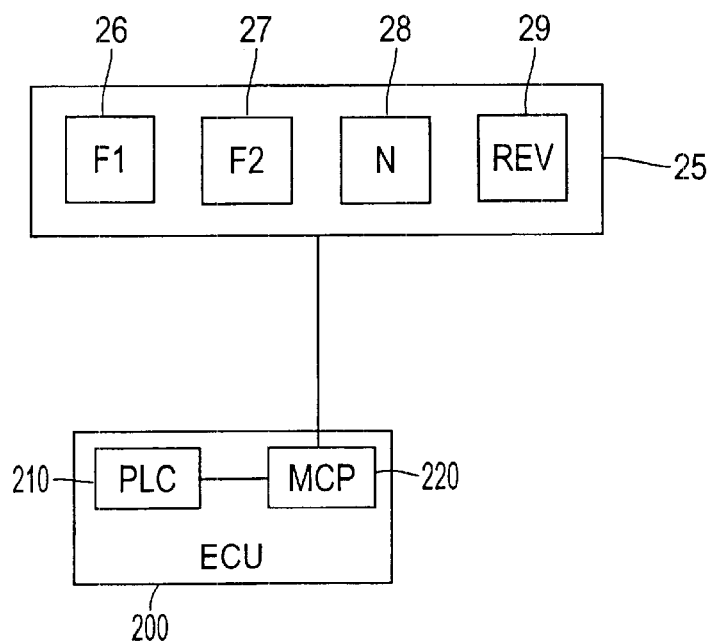
FIG. 6 is a diagram illustrating an exemplary embodiment of a driver's input control panel.

Referring to FIG. 6, a control panel 25 positioned, for example, in the operator area of the vehicle 10, includes a plurality of switches 26–29. After starting the vehicle 10 by moving the master switch 20 to the engine run position, one of the switches 26–29 is selected to establish a driving mode of the vehicle 10. A first driving mode F1 is established by selecting switch 26. The first driving mode F1 is established for driving the vehicle at lower speeds under conditions in which the vehicle 10 will start and stop frequently. A second driving mode F2 is established by selecting switch 27. The second driving mode F2 is established for driving the vehicle at higher speeds and under conditions in which the vehicle is started and stopped less frequently. The ECU 200 controls the electric motors 50 and 60 depending on which driving mode is established. The maximum power output and rpm of the electric motors 50 and 60 in the second driving mode F2 are higher than the maximum power output and rpm of the motors 50 and 60 in the first driving mode F1.

While two driving modes are shown, any number of modes can be used, depending on the driving conditions, road conditions, weather conditions, and the like.

The control panel 25 also includes a switch 28 to establish a neutral mode N. In the neutral mode N, the electric motors 50 and 60 are disengaged by the ECU 200. A reverse mode R is established by selecting a switch 29. In the reverse mode R, the electric motors 50 and 60 are controlled to rotate in the opposite direction of the first and second driving modes F1 and F2.

Figure 7:
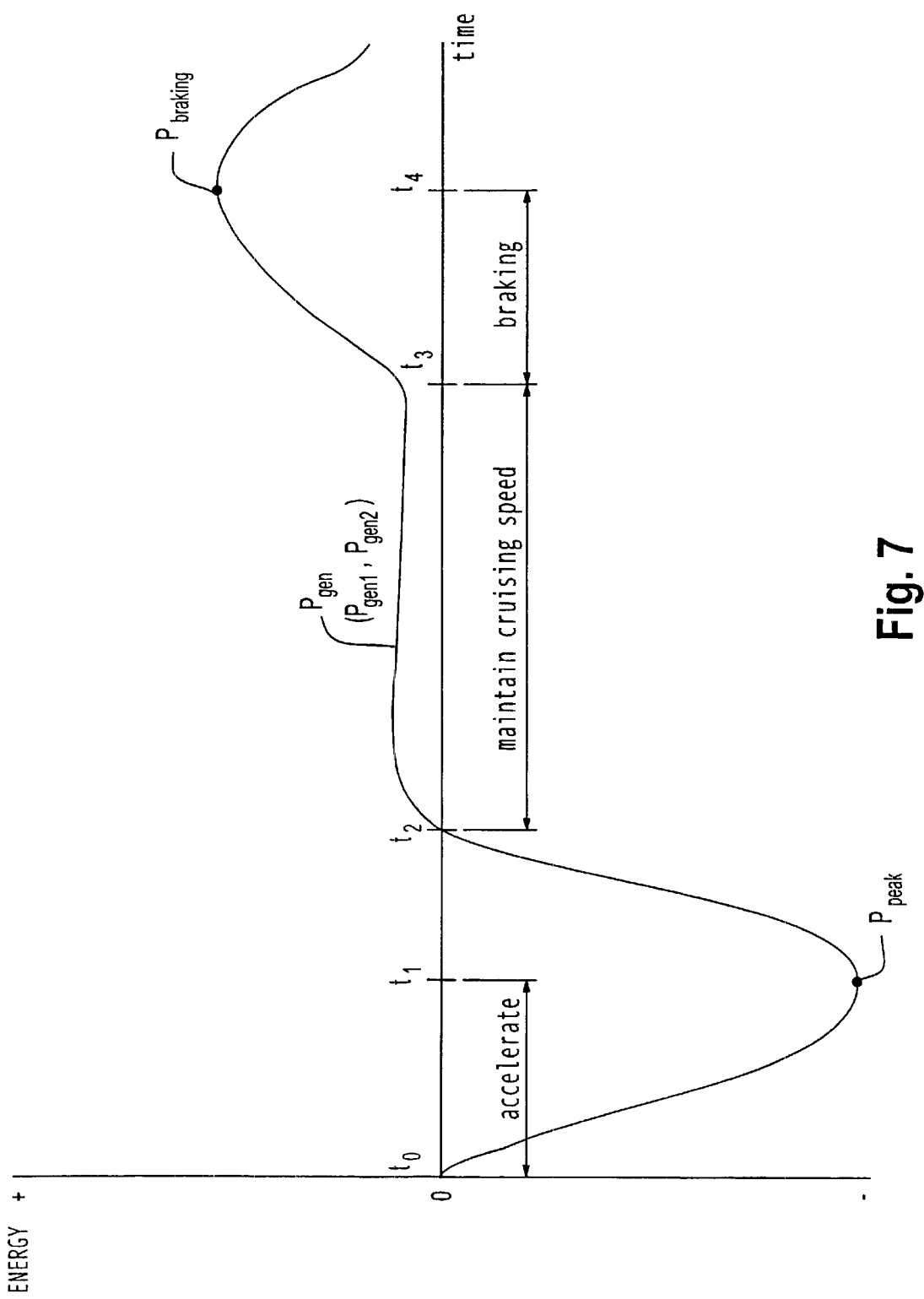
FIG. 7 is a diagram illustrating the relationship between the power created, the power stored, and the power consumed by the series hybrid electric vehicle.

Referring to FIG. 7, the relationship between the power generated, the power stored, and the power consumed over time, by the series hybrid electric vehicle 10 according to the invention will be explained.

Power is consumed from the battery array 30 by the electric motors 50 and 60 during acceleration of the vehicle 10 to a cruising speed. As shown in FIG. 7, the vehicle 10 reaches cruising speed at time $t_1$ which corresponds to a peak power $P_{peak}$ of the electric motors 50 and 60. The peak power $P_{peak}$ the electric motors 50 and 60 is dependent on the driving mode of the vehicle 10 selected by the operator. In the exemplary embodiment of the invention in which the electric motors 50 and 60 are each 220 Hp, the peak power $P_{peak}$ consumed by the electric motors 50 and 60 is 440 Hp.

The power consumption (traction effort) of the electric motors 50 and 60 during acceleration is represented by the curve below the horizontal axis and the area defined by the curve below the horizontal axis between the times $t_0$ and $t_2$ represents the total power consumption of the vehicle 10 during acceleration. In the event that the SOC of the battery array 30 is insufficient to achieve the cruising speed, the ECU 200 controls the motor controllers 51 and 61 to limit the peak power $P_{peak}$ the electric motors 50 and 60 may draw from the battery array 30. After the vehicle 10 has accelerated to cruising speed, the traction effort of the electric motors 50 and 60 may be reduced between the time $t_1$ and a time $t_2$, and the power consumption by the electric motors 50 and 60 may also be reduced.

The cruising speed of the vehicle 10 is maintained between the time $t_2$ and a time $t_3$. During the time between $t_2$ and $t_3$, the genset 300, 310 is operated to produce power $P_{gen}$ higher than the power consumption (traction effort) of the electric motors 50 and 60 necessary to maintain the vehicle's crusing speed. The differential in power between the traction effort and the power generated $P_{gen}$ is stored in the battery array 30.

The power $P_{gen}$ generated by the genset 300, 310 is dependent on the rpm of the engine 300 and a user demand signal sent to the genset 300, 310 that is controlled by the ECU 200. The ECU 200 controls the engine 300 to generally maintain the rpm of the engine 300, and the power generated $P_{gen}$, constant. However, it should be appreciated that the ECU 200 may control the engine 300 to reduce or increase the rpm of the engine 300, and thus the reduce or increase, respectively, the power generated $P_{gen}$.

The power generated $P_{gen}$ by the genset 300, 310 may be reduced if the SOC of the battery array 30 approaches an upper control limit at which the battery array 30 may become overcharged. The power generated $P_{gen}$ by the genset 300, 310 may be increased if the SOC of the battery array 30 approaches a lower control limit at which the battery array 30 would be unable to drive the electric motors 50 and 60 with enough torque to propel the vehicle 10. In an exemplary embodiment of the vehicle 10 in which the engine 300 is a 2.5 liter Ford LRG-425 engine powered by compressed natural gas, the power generated $P_{gen}$ is 70 Hp.

Regenerative braking occurs between the times $t_3$ and $t_4$ when the vehicle 10 decelerates after release of the accelerator pedal and/or when the vehicle 10 travels on a downhill slope at a constant speed. During regenerative braking, the electric motors 50 and 60 function as generators and current is supplied to the battery array 30 by the electric motors 50 and 60. The power generated $P_{braking}$ during regenerative braking is stored in the battery array 30.

The power generated by the genset 300, 310 during maintenance of the cruising speed and the power generated by regenerative braking $P_{braking}$ is represented by the curve above the horizontal axis and the area defined by the curve above the horizontal axis represents the total energy creation and storage of the vehicle 10 during maintenance of the cruising speed and regenerative braking.

The power $P_{gen}$ of the genset 300, 310 and the regenerative braking power $P_{braking}$ are controlled by the ECU 200 to substantially equal the energy consumption (traction effort) of the electric motors 50 and 60 during acceleration. In other words, the area defined by the curve below the horizontal axis is equal to the area defined by the curve above the horizontal axis. The ECU 200 controls the traction effort of the electric motors 50 and 60 (including the peak power $P_{peak}$ and the power generated $P_{gen}$ so that the power generated and the power stored do not exceed the power consumed, and vice versa, so as to maintain the SOC of the battery array 30 within a range of control limits. The ECU 200 controls the power generated $P_{gen}$ and the traction effort of the electric motors 50 and 60 so that the ampere hours during energy consumption do not exceed the thermal capacity of the battery array during power creation and storage.

As discussed above, the genset 300, 310 operates to produce power higher than the power consumption of the electric motors 50 and 60. In various exemplary embodiments, the power output by the genset 300, 310 declines as the SOC of the battery array 30 approach a higher level SOC. The battery array 30 is not fully charged, but managed to a SOC level predetermined to maximize the battery life and to accommodate the required cycle. Thus, it should be appreciated that the battery array 30 can be maintained at any SOC level less than the maximum SOC level. By keeping the battery array 30 at less than the maximum SOC, the battery array 30 is less likely to experience thermal runaway due to overcharging.

An exemplary embodiment for controlling the series type hybrid electric vehicle 10 to create a zero emission operation will be explained with reference to FIGS. 8 and 9. As should be appreciated, zero emission operation refers to the operation of the vehicle 10 when there is substantially no atmospheric, noise, thermal, or other discharges. The zero emission operation is automatically executed at predetermined areas or routes during the operation of the vehicle 10, or selectively activated by the operator.

One type of environment in which the vehicle 10 (which is capable of functioning in a zero emission mode) may be operated is in a closed route or circuit such as an airport or a confined shopping area where the vehicle travels the same circuit continuously. At certain locations in the circuit, it may be desirable for the vehicle to emit zero emissions. For example, at an airport, it is desirable that the vehicle emit zero emissions when it is in or immediately adjacent a terminal, a rental car facility, a parking garage, etc., i.e. any time the vehicle is in or adjacent a facility with limited air flow or circulation.

These zero emission environments may not be limited to buildings. It may be desirable for the vehicle 10 to operate at zero emissions even when the vehicle is in an open-air environment if public health is a concern, for example, next to a hospital or other medical facility, in an area where vehicle emissions are of a great concern, etc.

Vehicle 10 may, of course, be operated in any environment, and its course may vary, i.e., the vehicle may be operated over open roads, without being restricted to a particular circuit or route.

For purposes of illustration only, the use of vehicle 10 in a "closed" route or circuit will be discussed, with the route or circuit having a portion which requires zero emissions. Also, for purposes of illustration, when the vehicle 10 is in the zero emissions mode, little or no exhaust gases, noise, thermal energy or other discharges occur. However, in other exemplary embodiments, certain discharges may occur, while other discharges are restricted. For example, in some exemplary embodiments, little or no exhaust gases or noise may be emitted in the zero emissions mode, but thermal emissions may not be controlled. Any other combinations are possible, and are covered by this invention.

Figure 9:
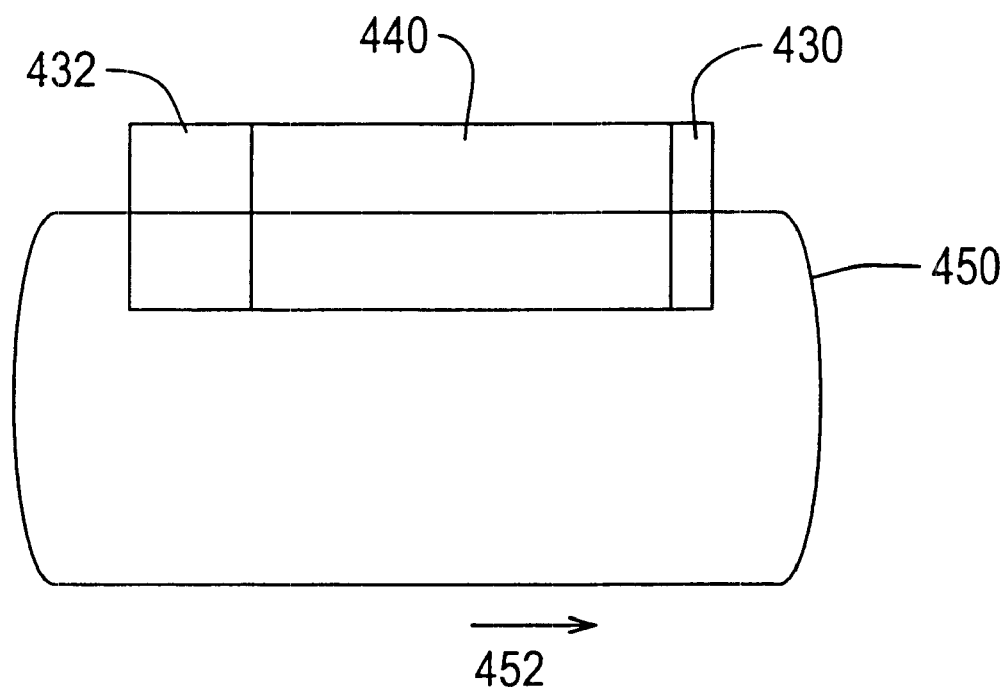
FIG. 9 is a diagram of a route used by the series hybrid electric vehicle with an area where zero emissions are tolerated.

As shown in FIG. 9, the vehicle 10 moves along a closed vehicle route 450 as indicated by arrow 452. The vehicle route 450 includes a zero emission zone 440. As discussed, the zero emission zone 440 may be, but is not limited to, the inside of a building or a tunnel. Also, route 450 may have more than one zero emission zone.

Figure 8:
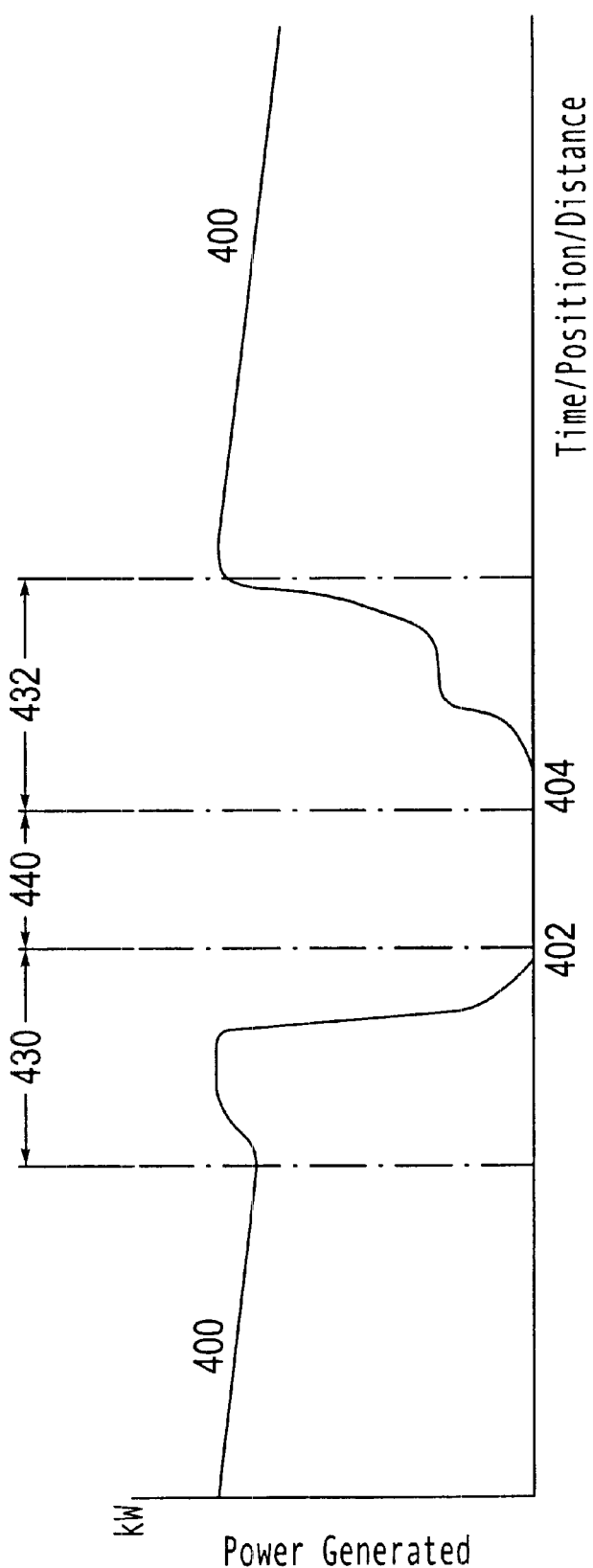
FIG. 8 is a graph illustrating the operation of the series hybrid electric vehicle to produce zero emissions for designated areas.

FIG. 8 is a graph illustrating the power generated by the genet 300, 310 as the vehicle 10 traverses the circuit 450. In FIG. 8, the x-axis defines the zones of operation for the vehicle 10 as it traverses the circuit 450. The y-axis defines the power generated by the genset 300, 310.

During normal operation, i.e., when the vehicle 10 is not in the zero emission mode, the vehicle 10 operates as indicated at area 400 of FIG. 8. In this area 400, the vehicle 10 operates as discussed above with regard to FIG. 7.

As shown in FIGS. 8 and 9, as the vehicle 10 moves along the route 450, the vehicle 10 enters a transition zone 430. The transition zone 430 is the area along the route 450 for the vehicle 10 to obtain a sufficient SOC for the battery array so that the vehicle 10 can pass through the zero emission zone 440 without receiving $P_{gen}$ from the genset 300, 310, and for removing lingering emissions from the vehicle 10. As should be appreciated, the transition zone 430 may be a variable length along the route 450. This length varies according to the operating speed of the vehicle 10, the normal SOC of the battery array 30, the thermal emissions of the vehicle, or any other factor that would effect the transition period for turning off the genset 300, 310 to prevent emissions from entering the zero emission zone 440, while maintaining sufficient power to operate the vehicle 10 through the zero emission zone 440. The length of the transition zone 430 may also vary according to the safety factors used to ensure that an adequate transition period is provided, i.e., so that there are little or no emissions in the zero emission zone.

The start of the transition zone 430 can be automatically detected by a GPS, radio, mechanical trip, mileage counter, etc. mounted on the bus. It should be appreciated that any automatic means currently available or later developed can be used for the vehicle 10 to determine the start of the transition zone 430. Also, a visible (e.g., a sign) or an audible signal mechanism could signal to the driver to place the vehicle 10 in the zero emissions zone.

Figure 10:
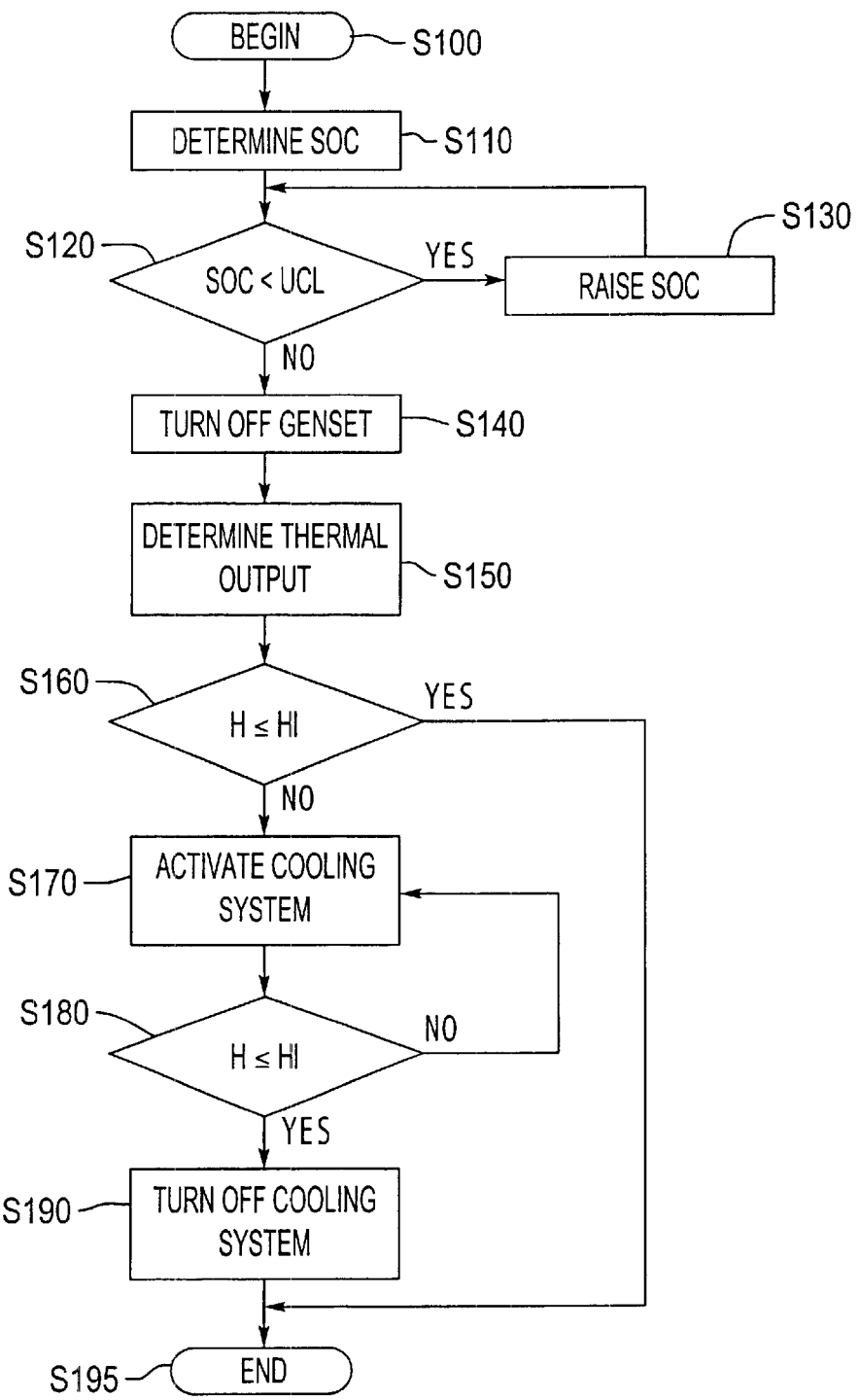
FIG. 10 is a flowchart illustrating an exemplary control of the series hybrid electric vehicle before entering a zero emission zone.

An exemplary embodiment of a method for controlling the vehicle 10 in the transition zone 430 is shown in FIG. 10. The control method begins at step S100 when the transition zone signal is received by the vehicle 10 or the driver switches the operation to the zero emissions mode. The method then proceeds to step S110 where the SOC of the battery array 30 is determined. The SOC of the battery array 30 is determined by the input from sensors to the MCP 220.

The control method then proceeds to step S120 where the SOC of the battery array 30 is compared to an upper control limit UCL. The upper control limit UCL is a predetermined electrical charge required for the battery array 30 to operate the electric motors 50, 60 through the zero emission zone 440 without receiving $P_{gen}$ by the genset 300, 310. As should be appreciated, the predetermined electrical charge can vary according to the length of the zero emission zone 440, the number of times the vehicle 10 stops/starts, the weight of the vehicle, or any other factor that would reduce the SOC of the battery array 30 while passing through the zero emission zone 440. The predetermined electrical charge can also vary according to safety factors used to ensure that enough electrical charge is available within the battery array 30.

If the SOC of the battery array 30 is less than the upper control limit UCL (S130: Yes), the control method proceeds to step S130 and the SOC of the battery array 30 is increased. The SOC of the battery array 30 can be increased by increasing the $P_{gen}$ by the genset 300, 310—by either increasing the $P_{gen}$ of the generator 310 to the current rpm of the engine 300, which determines the power generated by the genset 300, 310, or by increasing the rotational speed of the engine 300. The SOC of the battery array 30 can also be increased by modifying the traction drive power profile of the electric motors 50 and 60 to decrease the peak power $P_{peak}$, or by performing a global power shed by reducing or turning off ancillary systems of the vehicle 10 such as lighting and heating. Other methods for increasing the SOC of the battery array 30 above the upper control limit UCL are set forth in co-pending U.S. patent application Ser. No. 09/663,118, which is incorporated by reference.

When the MCP receives input from a sensor indicating that the SOC of the battery array 30 is equal to or greater than the upper control limit UCL (S130: No), the control method proceeds to step S140 where the PLC 210 switches off the genset 300, 310. The battery array 30 has a sufficient charge to operate the electric motors 50, 60 through the zero emission zone 440 without receiving $P_{gen}$ from the genset 300, 310.

The control method then proceeds to step S150. However, it should be appreciated that step S150 can occur before or simultaneously with the previous steps of the control method. In step S150, the MCP 220 receives input from various sensors as to the temperature H of the internal combustion engine 300, generator 310, generator controller 320, battery array 30, and motor controllers 51, 61.

In step S160, the temperature H of various components of vehicle 10, as determined by various sensors, is compared to a predetermined temperature H1. The temperature H1 is approximately the same as the temperature within the zero emission zone 440. As should be appreciated, to prevent thermal energy from transferring in the zero emission zone 440, the temperature H should be equal to or lower than the temperature H1 while the vehicle 10 is in the zero emission zone 440.

If the temperature H of any of the internal combustion engine 300, generator 310, generator controller 320, battery array 30, or motor controllers 51, 61 is greater than the temperature H1 (S160: No), the control method proceeds to step S170 and the cooling systems are activated to lower the temperature H to below than or equal to the temperature H1. In various exemplary embodiments, the cooling systems operate to lower the temperature H to below than or equal to the temperature H1 at a faster rate at the beginning of the cooling operation than at the end of the cooling operation. In this exemplary embodiment, it is thus possible to increase the safety factor in preventing thermal emissions from entering the zero emission zone 440 as thermal emissions are prevented at a farther distance from the zero emission zone 440.

The temperature H is again compared to the temperature H1 in step S180. If the temperature H of any of the internal combustion engine 300, generator 310, generator controller 320, battery array 30, or motor controllers 51, 61 is again greater than the temperature H1 (S180: No), the control method returns to step S170 where the cooling systems remain activated.

When the MCP receives input from all the sensors indicating that the temperature H of each of the internal combustion engine 300, generator 310, generator controller 320, battery array 30, or motor controllers 51, 61 is less than or equal to temperature H1, (S180: Yes), the control method then proceeds to step S190. At step S190 the cooling systems are turned off. The control method then ends at step S200 and thus ends the transition zone 430.

In various exemplary embodiments, a dwell period 402 is provided before the vehicle 10 enters the zero emission zone 440. The dwell period 402 can be a predetermined distance along the route 450 which ensures that the emissions have substantially ceased and that any lingering emissions pass from the vehicle 10 before the vehicle enters the zero emission zone 440. The dwell period 402 varies in accordance with the desired safety factor, and may be omitted in certain circumstances.

The vehicle 10 then moves into the zero emission zone 440, after performing the control method of FIG. 10, as described above. The vehicle 10 operates in the zero emission mode as the vehicle 10 moves through the zero emission zone 440. Accordingly, the genset 300, 310 and the cooling systems are turned off. The vehicle 10 is only driven by the electric motors 50, 60, which are operated by the battery array 30 without receiving $P_{gen}$ by the genset 300, 310.

The vehicle 10 then exits the zero emission zone 440. Similar to detecting the start of the transition zone 430 described above, the start of the transition zone 432, and thus the end of the zero emission zone 440, can be automatically detected by a GPS, radio, mechanical trip, mileage counter etc., on the vehicle 10. In the alternative, a visible or audible signal may be provided for the driver, to advise the driver to manually switch the vehicle 10 back to the normal operating mode.

The transition zone 432 is the transition period for turning on the genset 300, 310. As should be appreciated, the transition zone 432 may be a variable length along the route 450. This length varies according to the operating speed of the vehicle 10, time needed to restart the genset 300, 310, or any other factor that would delay the genset 300, 310 from returning to its normal operation.

In various exemplary embodiments, a dwell period 404 occurs immediately after the vehicle 10 leaves the zero emission zone 440. The dwell period can be provided to ensure that the emissions of the vehicle 10 are substantially prevented from entering the zero emission zone 440 after the vehicle 10 leaves the zero emission zone 440. This dwell period 404 may vary in accordance with the safety factor deemed necessary to prevent emissions from entering the zero emission zone 440, and may be omitted in certain circumstances.

Figure 11:
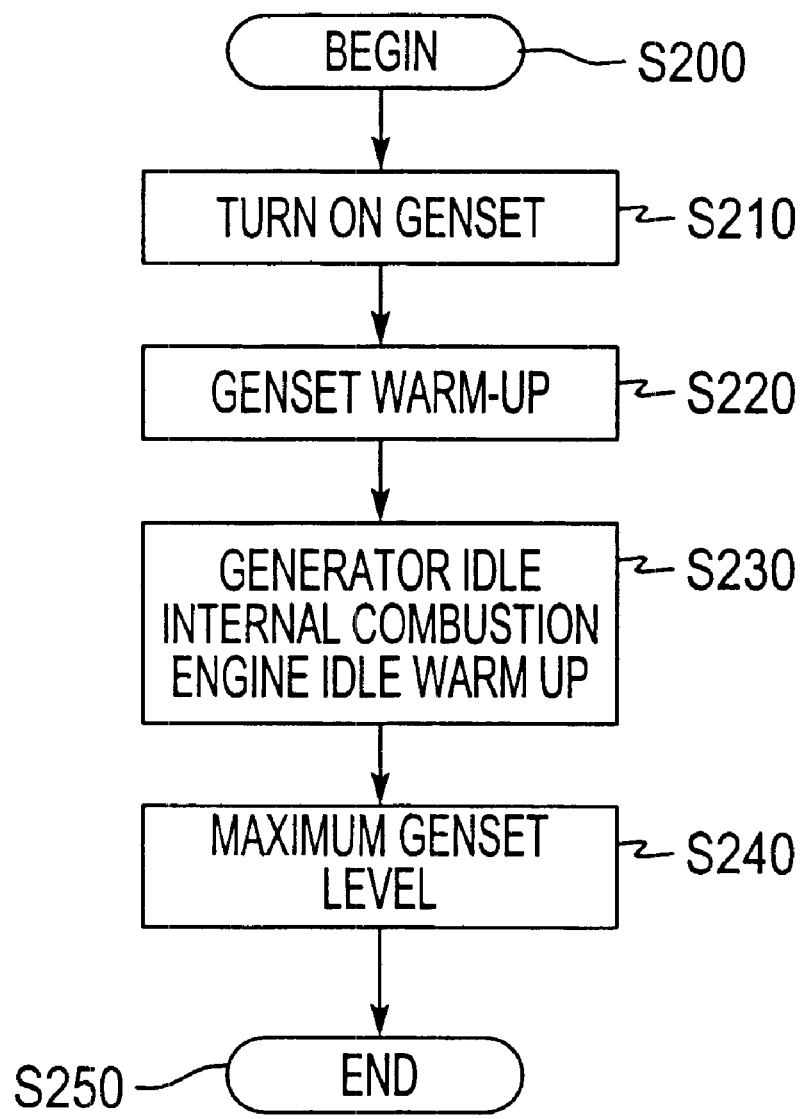
FIG. 11 is a flowchart illustrating an exemplary control of the series hybrid electric vehicle after leaving the zero emission zone.

An exemplary embodiment of a method for controlling the vehicle 10 in the transition zone 432 is shown in FIG. 11. The control method begins at step S200 and proceeds to step S210 where the PLC 210 restarts the genset 300, 310.

Upon restarting the genset 300, 310, the control method proceeds to step S220 where the genset 300, 310 enters an idle-warm up phase, wherein the engine 300 and generator 310 run at an idle speed, because the genset 300, 310 has been cooled while passing through the zero emission zone 440. Thus, the idle-warm up phase thermally warms the genset 300, 310 for full output.

The control method then proceeds to step S230 as the generator 310 reaches an appropriate thermal level to sustain full output. The MCP 220 receives input from a sensor associated with the generator 310 to determine if the generator 310 has reached an appropriate thermal level. The PLC 210 then stops the idle-warm up phase for the generator 310 and the generator remains idle until the MCP 220 receives input from a sensor associated with the internal combustion engine 300 to indicate that the internal combustion engine has reached an appropriate thermal level to sustain full output.

As should be appreciated, the generator 310 usually reaches an appropriate thermal level to sustain full output faster than the internal combustion engine 300. However, in various exemplary embodiments, step S230 can be removed as the PLC 210 can increase the rate to thermally warm the internal combustion engine 300 in step S220, as determined by the MCP 220 based on data from sensors, so that both the internal combustion engine 300 and generator 310 reach the appropriate thermal level at substantially the same time. Furthermore, step S230 can be removed as the PLC 210 can increase the rate to thermally warm the generator 310 can be lowered, as determined by the MCP 220 based on data from sensors, in step S220 so that both the internal combustion engine 300 and generator 310 reach the appropriate thermal level at substantially the same time.

Once the engine 300 and generator 310 reach the desired temperatures, as determined by the MCP 220 based on data from sensors, the control method then proceeds to step S240 where the PLC 210 directs the genset 300, 310 to operate at the maximum, or near maximum capacity, to electrically replenish the SOC of the battery array 30. In this exemplary embodiment, when the genset 300, 310 reaches the substantially full power output, the power output by the genset 300, 310 declines as the SOC of the battery array 30 approaches a higher level SOC. The control method then ends at step S250 and thus ends the transition zone 432.

After the end of the transition zone 432, the vehicle thus returns to the normal operation along the route 450 as indicated at area 400.

While the invention has been described with reference to various exemplary embodiments thereof, it is to be understood that the invention is not limited to the disclosed embodiments or constructions. To the contrary, the invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the invention.

In addition, this invention covers apparatus and methods to reduce any or more of the various emissions emitted by a vehicle, e.g., exhaust gases, noise, thermal energy, etc. Moreover, this invention covers circumstances in which the emissions are selectively reduced at particular times, even if not reduced to zero, for example where vehicle emissions are reduced for a set period of time, but not completely eliminated. Also, as stated, the subject apparatus and method can be utilized by manual activation, as opposed to the use of automatic switch mechanisms.

What is claimed is:

1. A method for adaptively controlling a series type hybrid electric vehicle including an internal combustion engine connected to a generator and at least one electric motor propelling the vehicle through a zone of reduced emissions, comprising:
    determining a zone of reduced emission;
    turning off an internal combustion engine and a generator before entering the zone;
    maintaining the internal combustion engine and the generator in an off mode while the vehicle is propelled in the zone by the motor; and
    turning on the internal combustion engine and the generator after the vehicle leaves the zone.

2. The method of claim 1, wherein the zone is a substantially zero emission zone.

3. The method of claim 1, wherein emission gases are prevented from entering the zone.

4. The method of claim 1, further comprising:
    determining the electrical charge of an electric motor before entering the zone; and
    charging the electric motor to a predetermined electrical level before entering the zone if the electrical charge is below the predetermined electrical level.

5. The method of claim 4, further comprising:
    raising the rate for charging the electric motor to reach the predetermined electrical level.

6. The method of claim 5, further comprising:
    increasing power generated by a generator to a current rotational speed of the engine to increase the rate for charging.

7. The method of claim 5, further comprising:
    increasing a rotational speed of the engine to increase the rate for charging.

8. The method of claim 5, further comprising:
    modifying a traction drive power profile of the motor to increase the rate for charging.

9. The method of claim 5, further comprising:
    performing a global power shed by reducing ancillary systems of the vehicle to increase the rate for charging.

10. The method of claim 1, further comprising:
    lowering an operating temperature of the engine and generator to a predetermined temperature before the vehicle enters the zone.

11. The method of claim 10, wherein the operating temperature of the vehicle is lowered at a higher rate when the vehicle is further away from the zone and at a lower rate when the vehicle is closer to the zone.

12. The method of claim 1, further comprising:
    allowing a dwell period to occur between turning off the internal combustion engine and the generator and entering the zone to prevent emissions from entering the zone.

13. The method of claim 1, further comprising:
    allowing a dwell period to occur between after leaving the zone and turning on the internal combustion engine and generator to prevent emissions from entering the zone.

14. The method of claim 1, further comprising:
    warming idly the internal combustion engine and generator after leaving the zone before returning the internal combustion engine and the generator to normal operation.

15. The method of claim 14, further comprising:
    maintaining the generator at an idle state while warming the internal combustion engine to a predetermined level.

16. The method of claim 15, further comprising:
    operating the internal combustion engine and generator at an approximately full operational level after the internal combustion engine is warmed to the predetermined thermal level.

17. The method of claim 16, further comprising:
    lowering the operational level of the internal combustion engine and generator when the electrical charge of the electric motor reaches a predetermined electrical level.

18. The method of claim 1, wherein the vehicle responds to sensors to automatically change an operation mode of the vehicle.

19. The method of claim 1, wherein the vehicle responds to manual switches to manually change an operation mode of the vehicle.

20. A series type hybrid electric vehicle, comprising:
    an internal combustion engine connected to a generator;
    a battery array receiving current at least from the generator;
    a least one electric motor receiving current from the battery array, the motor propelling the vehicle; and
    a controller that:
        determines a zone of reduced emissions;
        turns off the internal combustion engine and the generator before entering the zone;
        maintains the internal combustion engine and the generator in an off mode while the vehicle is propelled in the zone by the motor; and
        turns on the internal combustion engine and the generator after the vehicle leaves the zone.

21. The vehicle of claim 20, wherein the zone is a substantially zero emission zone.

22. The vehicle of claim 20, wherein emission gases are prevented from entering the zone.

23. The vehicle of claim 20, wherein the controller:
    determines the electrical charge of the battery array before entering the zone; and activates the generator to charge the battery array to a predetermined electrical level before entering the zone if the electrical charge is below the predetermined electrical charge.

24. The vehicle of claim 23, wherein the controller:
increases the rate for charging the battery array to reach the predetermined electrical level.

25. The vehicle of claim 24, wherein the controller:
increases power generated by the generator to a current rotational speed of the engine to raise the rate for charging.

26. The vehicle of claim 24, wherein the controller:
increases a rotational speed of the engine to increase the rate for charging.

27. The vehicle of claim 24, wherein the controller:
modifies a traction drive power profile of the motor to increase the rate for charging.

28. The vehicle of claim 24, wherein the controller:
performs a global power shed by reducing ancillary systems of the vehicle to increase the rate for charging.

29. The vehicle of claim 20, wherein the controller:
lowers the operating temperature of the engine and generator to a predetermined temperature before the vehicle enters the zone.

30. The vehicle of claim 27, wherein the operating temperature of the vehicle is lowered at a higher rate when the vehicle is farther away from the zone and at a lower rate when the vehicle is closer to the zone.

31. The vehicle of claim 20, wherein the controller:
allows a dwell period to occur between turning off the internal combustion engine and the generator and entering the zone to prevent emissions from entering the zone.

32. The vehicle of claim 20, wherein the controller:
allows a dwell period to occur between after leaving the zone and turning on the internal combustion engine and generator to prevent emissions from entering the zone.

33. The vehicle of claim 20, wherein the controller:
allows the internal combustion engine and generator to warm idly after leaving the zone before returning the internal combustion engine and the generator to a normal operation.

34. The vehicle of claim 33, wherein the controller:
maintains the generator at an idle state while warming the internal combustion engine to a predetermined level.

35. The vehicle of claim 34, wherein the controller:
operates the internal combustion engine and generator at an approximately full operational level after the internal combustion engine is warmed to the predetermined thermal level.

36. The vehicle of claim 35, wherein the controller:
lowers the operational level of the internal combustion engine and generator when the electrical charge of the electric motor reaches a predetermined electrical level.

37. The vehicle of claim 20, wherein the controller responds to sensors to automatically change an operation mode of the vehicle.

38. The vehicle of claim 20, wherein the vehicle responds to manual switches to manually change an operation mode of the vehicle.

39. A series type hybrid electric vehicle, comprising:
an internal combustion engine connected to a generator;
a battery array receiving current at least from the generator;
a least one electric motor receiving current from the battery array, the motor propelling the vehicle; and
a controller that controls the vehicle according to the following modes:
a normal mode where the internal combustion engine and generator operates to produce power higher than a power consumption of the motor;
a first transition mode, after the controller determines a zone of reduced emissions, for determining an electrical charge of the battery array before entering the zone, activating the generator to charge the battery array to a predetermined electrical level before entering the zone if the electrical charge is below the predetermined electrical charge, and turning off the internal combustion engine and the generator before entering the zone; and
a reduced emission mode after the first transition mode for maintaining the internal combustion engine and the generator in the off mode while the vehicle is propelled in the zone by the motor.

40. The vehicle of claim 39, further comprising:
a second transition mode for allowing the internal combustion engine and generator to warm idly after the reduced emission mode and turning on the internal combustion engine and the generator after the vehicle warms idly before returning to the normal mode.

41. The vehicle of claim 39, wherein the reduced emission mode occurs during a substantially zero emission zone.

42. The vehicle of claim 39, wherein the reduced emission mode prevents emission gases.

43. The vehicle of claim 39, wherein the controller:
increases the rate for charging the battery array to reach the predetermined electrical level.

44. The vehicle of claim 42, wherein the controller:
increases power generated by the generator to a current rotational speed of the engine to raise the rate for charging.

45. The vehicle of claim 42, wherein the controller:
increases a rotational speed of the engine to increase the rate for charging.

46. The vehicle of claim 42, wherein the controller:
modifies a traction drive power profile of the motor to increase the rate for charging.

47. The vehicle of claim 42, wherein the controller:
performs a global power shed by reducing ancillary systems of the vehicle to increase the rate for charging.

48. The vehicle of claim 39, wherein the controller:
lowers the operating temperature of the engine and generator to a predetermined temperature before the vehicle enters the zone during the first transition mode.

49. The vehicle of claim 48, wherein the operating temperature of the vehicle is lowered at a higher rate when the vehicle is farther away from conducting the zero emission mode and at a lower rate when the vehicle is closer to conducting the zero emission mode.

50. The vehicle of claim 39, wherein the controller:
allows a dwell period to occur between the first transition mode and the reduced emission mode to prevent emissions from entering the zone.

51. The vehicle of claim 40, wherein the controller:
allows a dwell period to occur between the reduced emission mode and the second transition mode to prevent emissions from entering the zone.

52. The vehicle of claim 40, wherein the controller:
maintains the generator at an idle state while warming the internal combustion engine to a predetermined level.

53. The vehicle of claim 40, wherein the controller:
operates the internal combustion engine and generator at an approximately full operational level after the internal combustion engine is warmed to the predetermined thermal level.

54. The vehicle of claim 53, wherein the controller:
lowers the operational level of the internal combustion engine and generator when the electrical charge of the electric motor reaches a predetermined electrical level.

55. The vehicle of claim 39, wherein the controller responds to sensors to automatically change an operation mode of the vehicle.

56. The vehicle of claim 39, wherein the vehicle responds to manual switches to manually change an operation mode of the vehicle.

* * * * *